(12) United States Patent
Selvarajan et al.

(10) Patent No.: US 11,695,556 B2
(45) Date of Patent: Jul. 4, 2023

(54) METHODS, SYSTEMS AND APPARATUSES TO CONFIGURE A FLIGHT MANAGEMENT SYSTEM (FMS)

(71) Applicant: HONEYWELL INTERNATIONAL INC., Charlotte, NC (US)

(72) Inventors: Ravikumar Selvarajan, Madurai (IN); Philip Toews, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 265 days.

(21) Appl. No.: 17/082,539

(22) Filed: Oct. 28, 2020

(65) Prior Publication Data

US 2022/0085981 A1 Mar. 17, 2022

(30) Foreign Application Priority Data

Sep. 15, 2020 (IN) .............................. 202011039914

(51) Int. Cl.
*H04L 29/06* (2006.01)
*H04L 9/08* (2006.01)
*H04L 9/32* (2006.01)
*H04L 9/30* (2006.01)
*G06F 16/11* (2019.01)

(52) U.S. Cl.
CPC ............ *H04L 9/088* (2013.01); *G06F 16/122* (2019.01); *H04L 9/30* (2013.01); *H04L 9/3247* (2013.01)

(58) Field of Classification Search
CPC ......... H04L 9/088; H04L 9/30; H04L 9/3247; H04L 9/0891; G06F 16/122
See application file for complete search history.

(56) References Cited

U.S. PATENT DOCUMENTS

| 10,319,240 B2 | 6/2019 | Beernaert |
| 2006/0265508 A1* | 11/2006 | Angel ................. H04L 61/2567 709/230 |
| 2008/0052517 A1 | 2/2008 | Anstey et al. |
| 2009/0058682 A1 | 3/2009 | True |
| 2014/0075506 A1* | 3/2014 | Davis ................. H04B 7/18508 726/3 |
| 2017/0063995 A1 | 3/2017 | Gunn et al. |
| 2017/0187539 A1* | 6/2017 | Thompson .......... H04W 12/068 |

FOREIGN PATENT DOCUMENTS

EP 3547736 A1 10/2019

* cited by examiner

*Primary Examiner* — Joseph P Hirl
*Assistant Examiner* — Leynna Truvan
(74) *Attorney, Agent, or Firm* — Lorenz & Kopf LLP

(57) ABSTRACT

Methods, systems, and apparatuses are provided for flight management to configure an aircraft configuration (config) file accessible by the avionic system wherein an avionic service is implemented by a flight management system (FMS) for corroborating allowance of access using one of a set of validation procedures for corroboration prior to execution of a request for content to the config file including validating that a user request for a session is authorized based on user identification data, that a client request by an Electronic Flight Bag (EFB) application for a session is authorized based on client identification data, and in response to the client request, determining that an EFB application request is encrypted and performing a decrypt procedure of the EFB application request based on private key data of a private key; and encrypting an EFB application response based on public key data of a public key from the config file.

20 Claims, 6 Drawing Sheets

METHODS, SYSTEMS AND APPARATUSES TO CONFIGURE A FLIGHT MANAGEMENT SYSTEM (FMS)

CROSS-REFERENCE TO RELATED APPLICATIONS

This application claims priority to the Indian Provisional Patent Application 202011039914, filed at the Indian Patent Office on Sep. 15, 2020, the contents of which are hereby incorporated by reference.

TECHNICAL FIELD

Embodiments of the subject matter described herein relate generally to aviation management service, and more particularly, embodiments of the subject matter relate to a method, system, and apparatus to configure loadable software files of aircraft systems by configuring a connected aircraft configuration (config) file that is either a separately loadable software file or incorporated in an avionic application using a permission validation process to enable deployment of secure flight planning data.

BACKGROUND

Technological advancements in the aerospace industry have dramatically altered the way various stakeholders have been conducting their day-to-day businesses. One of the significant technological advancements is the development of onboard connectivity to external sources from which a variety of new applications have developed. There has been an evolution in the development of offboard and cloud-based solutions that complement a variety of onboard aircraft avionic functions. For example, the electronic flight bag (EFB) flight planning solution using external data can complement the overall functions of some onboard avionics functions like Flight Management Systems (FMSs).

There is a need to enhance cybersecurity with use of configuration (config) files that are externally connected to onboard avionic systems because the config file can affect complex flight systems. There is desired a mechanism that properly secures access data to the config file when initiating the loading process of the config file to the aircraft avionic systems, when updating the config file with aircraft avionic systems, and when providing access to data of the config files by EFB applications.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method, system, and apparatus for connecting and updating the content of config files that are external or internal to avionic systems for flight operations and planning.

In one embodiment, a flight management method implemented by an avionic system is provided. The flight management method includes: configuring, in the avionic system, an aircraft configuration (config) file as either a separately loadable software file or incorporated in an avionic service accessible by the avionic system, wherein an avionic service is implemented by a flight management system (FMS); when operating the FMS in a normal mode to connect to the config file, corroborating by the FMS using at least one of a set of validation procedures for corroboration of an allowance of access prior to enabling an execution of a request for content to the config file, wherein the set of corroboration procedures at least includes: validating, by a validation procedure by the FMS, that a user request for a session is authorized based on user identification data retrieved from the config file, validating, by another validation procedure of the FMS, that a client request by an Electronic Flight Bag (EFB) application for a session is authorized based on client identification data retrieved from the config file, and in response to the client request by an EFB application, determining by the FMS that an EFB application request is encrypted and performing a decrypt procedure of the EFB application request based on private key data of a private key retrieved from the config file; and encrypting, by the FMS, an EFB application response based on public key data of a public key from the config file.

In various exemplary embodiment, the method includes configuring, in the avionic service, the config file as a connected Aircraft Configuration Database (CACDB) file. The method further includes: in a direct setup mode by the FMS to connect to the config file, configuring a setup manager to execute an open-world application in order to make alterations to content of the config file by another validation procedure of a setup manager using a digital signature encrypted by the public key wherein the validation procedure of the setup manager includes an authentication procedure. The method further includes during the authentication procedure of the setup manager, receiving by the FMS, digital signature information to decrypt the digital signature in conjunction with using the private key based on private key data in the config file to enable the decrypt of content of the config file. The method further includes: after decryption of the digital signature information in the authentication procedure of the setup manager, comparing, by the FMS, a digital signature key based on the digital signature to a private key already in a setup manager's possession wherein if a private key matches the digital signature key, then validating the setup manager's private key. The method further includes in response to a setup manager's validation of the private key in the authentication procedure, enabling initiation of a direct setup mode by the setup manager to update content of the config file. The content of config file includes a list of parameter attributes, pilot identifications, client identifications, public and private keys, and flexible APIs.

In another exemplary embodiment, an avionic system configured for flight management service is provided. The avionic system includes: an aircraft configuration (config) file that is separately loadable software file in the avionic system or incorporated in an avionic service accessible by the avionic system wherein the avionic service is implemented by a flight management system (FMS); the FMS configured to operate in a normal mode to connect to the config file; the FMS configured in the normal mode operation to corroborate using at least one of a set of validation procedures for corroboration of an allowance of access prior to enablement of an execution of a request for content to the connected config file, wherein the set of corroboration procedures at least includes: the FMS configured to validate, by a first validation procedure, that a user request for a session is authorized based on user identification data retrieved from the config file, the FMS configured to validate, by a second validation procedure, that a client request by an Electronic Flight Bag (EFB) application for a session is authorized based on client identification data retrieved from the config file, and in response to the client request by an EFB application, the FMS configured to determine that an EFB application request is encrypted and to perform a decryption procedure of the EFB application request based on private key data of a private key retrieved from the config file; and the FMS configured to encrypt an EFB application response based on public key data of a public key from the config file.

In various exemplary embodiments, the avionic system includes in the avionic service, the config file is configured as a Connected Aircraft Configuration Database (CACDB) file. The avionic system further includes: in a direct setup mode by the FMS for connection to the config file, a setup manager configured to execute an open-world application in order to make alterations to content of the config file via a third validation procedure by a setup manager configured to use a digital signature which has already been encrypted by the public key wherein the validation procedure of the setup manager includes an authentication procedure.

The avionic system further includes in execution of the authentication procedure by the setup manager, the FMS configured to receive digital signature information for decryption of the digital signature in conjunction with use of the private key based on private key data in the config file to enable the decryption procedure.

The avionic system further includes: after decryption of the digital signature information, the FMS configured to compare a digital signature key based on the digital signature to a private key already in possession by the setup manager wherein, if a private key matches the digital signature key, then enabling validation of the setup manager's private key.

The avionic system further includes in response to a setup manager's validation of the private key, the FMS configured to initiate a direct setup mode by the setup manager to update content of the config file. The config file's content includes a list of parameter attributes, pilot identifications, client identifications, public and private keys, and flexible APIs.

In yet another exemplary embodiment, an apparatus for flight management service is provided. The apparatus includes: at least one processor deployed in an avionic system coupled to an aircraft configuration (config) file that is either a separately loadable software file or incorporated in an avionic service accessible by the processor, the at least one processor programmed to: operate in a normal mode to connect to the config file to: corroborate using at least one of a set of validation procedures for corroboration of allowance of access prior to enablement of an execution of a request for content to the connected config file, wherein the processor programmed to: validate, by a first validation procedure, that a user request for a session is authorized based on user identification data retrieved from the config file; validate, by a second validation procedure, that a client request by an Electronic Flight Bag (EFB) application for a session is authorized based on client identification data retrieved from the config file; in response to the client request by an EFB application, determine that an EFB application request is encrypted and to perform a decryption procedure of the EFB application request based on private key data of a private key retrieved from the config file; and encrypt an EFB application response based on public key data of a public key from the config file.

In various exemplary embodiments, the apparatus further includes: the processor programmed to configure the config file as a connected Aircraft Configuration Database (CACDB) file. The apparatus further includes the processor programmed to: in a direct setup mode for connection to the config file, configure a setup manager to execute an open-world application in order to make alterations to content of the config file by a third validation procedure by a setup manager configured to use a digital signature which has already been encrypted by the public key wherein the validation procedure of the setup manager includes an authentication procedure. The apparatus further includes: the processor programmed to in performance of the authentication procedure by the setup manager, receive digital signature information to decrypt the digital signature in conjunction with use of the private key based on private key data in the config file to enable the decryption procedure. The apparatus further includes: the processor programmed to: after decryption of the digital signature information, compare a digital signature key based on the digital signature to a private key already in possession by the setup manager wherein if a private key matches the digital signature key, then enabling validation by of the setup manager's private key. The apparatus further includes: the processor programmed to in response to a setup manager's validation of the private key, enable initiation of a direct setup mode by the setup manager to update content of the config file.

This summary is provided to introduce a selection of concepts in a simplified form that is further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
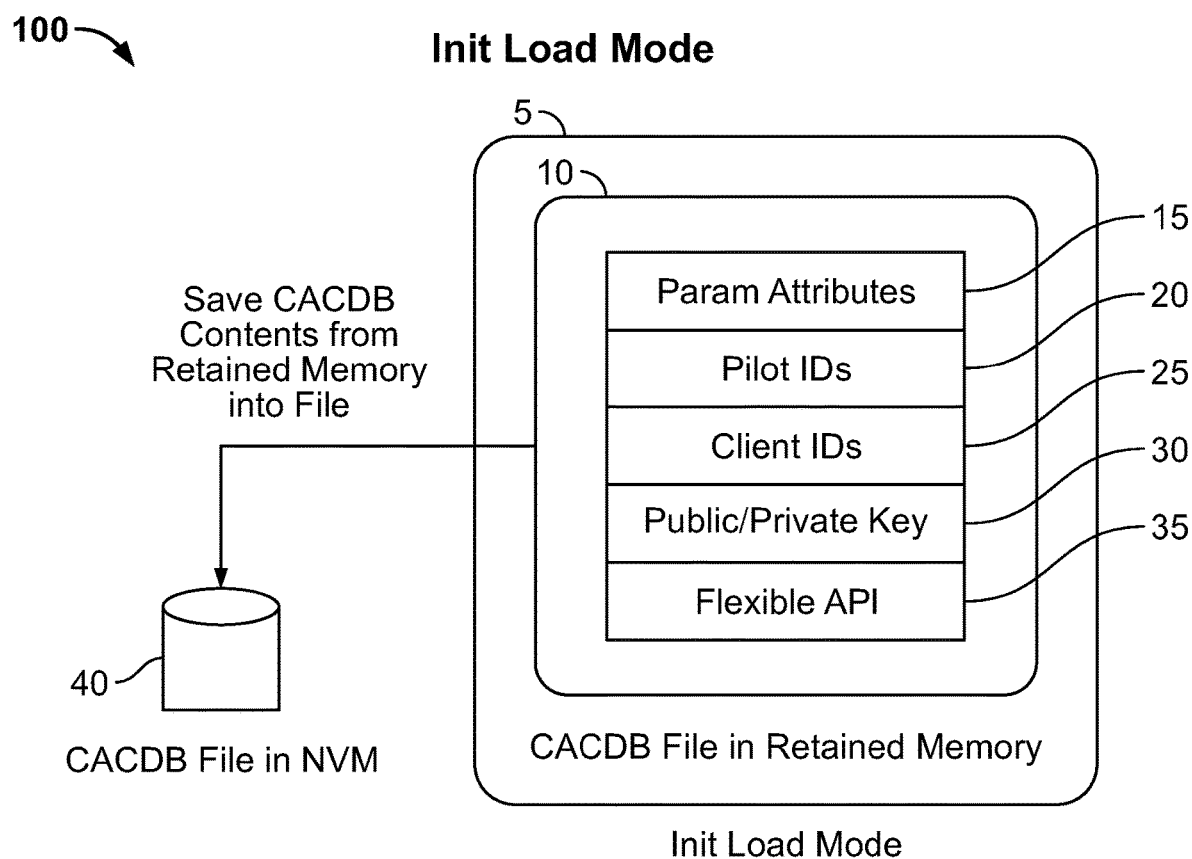
FIG. 1 illustrates an exemplary initiation of a load mode of the connected aircraft config file system in accordance with an embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

A configuration (config) file is a file that configures the initial settings, or other parameters of an application, or various applications of enabled systems and devices. It is used to configure settings at the server, client, and remote applications, and is actuated by parameters, events, and other periodic instances. In various embodiments, config files are read at the startup of initiated applications.

In an exemplary embodiment, the flight personnel (i.e., the pilot) is able to perform flight planning for an EFB flight planning solution for enhanced flight operation performance by a different planning solution that is based on an EFB application that includes a significant amount of real-time parameters. For example, the real-time parameters which can be used include real-time weather conditions, current traffic in the vicinity, and fuel consumption data during flight operations. This real-time parameter data can be pushed or received by the FMS with a manual user actuation (i.e., a click of a button on a user interface or the like) to initiate receipt of the updated real-time parameter information.

It is also feasible to include other EFB applications and cloud-based applications that use data sent to onboard avionics for better performance of flight systems. This data can also be used in initialization of the flight system, in the take-off data, and in the landing data for flight operations, etc. . . . For example, the data received can include an active flight plan, current aircraft state, radio tuned, ATC log, flight summary, fault reports, etc. The level or amount of data transacted can be configured to marry or connect with the robust functionality of certain avionic systems, that can enable enhanced dynamic real-time awareness. This, in turn, will increase the operational efficiencies in aircraft operations as well as promote better passenger flight safety and operations of the flight crew.

The increased connectivity with the EFB solutions in conjunction raises certain challenges or obstacles in flight operations. For example, certain air carriers require or desire different data for aircraft avionic systems. In other words, not all the air carriers want the same information for provisioning or initiating avionic systems or executing EFB solutions. Certain air carriers with different operating requirements desire to provision and to configure avionic systems based on different data sent and received from the FMS.

In an exemplary embodiment, the air carrier also would like to change the list of FMS data they want to send and retrieve at any time later after the aircraft is in service. There is a need to protect the onboard FMS from unauthorized access (i.e. cyber-attacks) from client applications or access to unsubscribed data from authorized client applications The present disclosure describes avionics systems like FMS that are enabled to connected with open-world applications like EFB hosted applications using new configuration files. In this case, the kind of config file used is referred to herein as a Connected Aircraft Config Database (CACDB) file. This file can either be configured as a separately loadable file or can be bundled along with the FMS application software. While the present disclosure describes the use of a CACDB file, it is contemplated that a variety of different configuration (config) files can be implemented, and that the config files can be located internally or externally to aircraft avionic systems.

In various exemplary embodiments, the config file can be accessed in conjunction with the initialization operation of the flight management service (FMS) that enables configuring a Connected Aircraft Config Database (CACDB) file as either a separately loadable software file module or incorporated in an FMS application software. The config file can retain flight management settings and parameter content that can include parameter attributes, pilot identifications (IDs), client IDs, public and private key, and flexible application programming interfaces (APIs) formats.

In various exemplary embodiments, to ensure secure access to FMS systems, the config file (i.e., the CACDB file) may be configured with content to enable access procedures of the EFB application for corroboration of the pilot, client, and other attributes, and may include validation steps for session authorization based on pilot and client IDs and encrypted associated EFB services. For example, the encrypted EFB services by public-key encryption can require enhanced cybersecurity steps to decrypt the EFB services based on private key data.

In other exemplary embodiments, the config file may enable the use of flexible API formats to process via a processor, various generic API requests, and API responses.

A direct setup mode of the FMS may be provided to enable a setup manager to follow other procedures to execute an open-world application to alter the CACDB file content. As an example, the alternative procedures can include a process to authenticate the setup manager using a unique digital signature that is encrypted by the public key.

In various exemplary embodiments, the encryption that is enabled can be performed by receipt of signature information, which is used to decrypt the special digital signature using the private key contained in the CACDB file content. Also, a direct setup mode can be implemented with private key protection to update the CACDB content file In various exemplary embodiments, the present disclosure describes systems and methods that enable a Connected Aircraft Config DB (CACDB) file as either a separate loadable software file module or incorporated in an FMS application software for legacy aircraft systems in a setup mode allowing an open-world application to configure avionics and a loadable file such as CACDB from a navigation database (NavDB) with a digital signature and a private license key. The aircraft avionic systems retaining the config file may be configured with a flexible API definition that enables various aircraft avionic systems to fetch new avionics data and to build a new API response. The aircraft avionic systems can validate a client request by use of contents of a configuration set up file, which may also contain the private license key information to decrypt the public key encrypted content. The aircraft avionic systems present a setup mode that enables an EFB and an open-world application to configure the aircraft avionic systems to access data the config file.

In exemplary embodiments, the present disclosure describes systems and processes that enable a loadable config file with contents that is allowed for access to be altered, appended, and replaced as required by various air carrier entities and technical personnel by an open-world application during a setup mode of the config file system. In the setup mode, the setup manager that performs the config file changes is validated to perform the changes by aircraft avionic systems using a combination of steps that performs a validation task with a digital signature and private key.

FIG. 1 illustrates an exemplary initiation load mode of the connected aircraft config file system in accordance with an embodiment. In FIG. 1, in an exemplary embodiment, avionics such as a flight management system (not shown) is enabled and configured to connect with an open world application for an electronic flight bag (EFB) for flight deck use.

In the initiate (init) load mode 100, an EFB hosted application is configured with data from a new config file; the config file is referred to as a Connected Aircraft Config DB (CACDB) file 10. In this case, the config file can either be configured as a separately loadable config file or could be bundled along with the FMS application software. The CACDB file 10 will hold or retain all or most all of the information that is required for use as the FMS data. The CACDB file 10 can be retrieved by automated or semi-automated uploaded actions or downloaded by the EFB application and stored in the retained memory 5.

If the aircraft is equipped with retained memory, then upon the first initialization of an aircraft avionic system (i.e., a startup of a certain avionic system), as an example, the onboard FMS is configured to enter init load mode 100 in which the contents of the CACDB file 10 are loaded (i.e., copied) into the retained memory 5. The CACDB file 10 is a loadable field file that is consists of a vast structured database with multiple tables storing various types of data of information related to authorization, usage, real-time data, and processing of EFB services subscribed to by various air carriers. For example, the CACDB file 10 may include a collection of data formed by an array of inputs resulting in an enormous volume of external data for usage by various EFB applications. The receiving clients can modify the amount of data received in the contents of the CACDB file 10 based on subscribed services, data rates, and data services provided. The onboard systems of an aircraft will be configured for access dependent on authorization and validation steps.

In an exemplary embodiment, after a certain number of power-ups of the FMS, a new CACDB file may be required to be loaded by the aircraft avionic system. In this instance, the FMS is required to re-enter and re-start the init load mode 100; once re-started in the init load mode 100, the contents of the config file of a prior configuration of the FMS contained in the retained memory 5 is erased and overwritten with the contents of a newer loaded version of CACDB file 10.

If the particular aircraft avionic system does not contain a retain type memory, the contents of the CACDB file 10 will be loaded into a RAM type memory and will be extinguished or lost each time there is a power shut down of the particular aircraft avionic system. Since the CACDB file 10 contents will be lost in power shut down, the init load mode 100 will be reinitiated each time the aircraft avionic system is powered up (i.e., the CACDB file 10 will be loaded into RAM).

The CACDB file 10 can be configured with various data details for use when connecting based on parameter attributes 15, and the data details provided can include a list of APIs, a type of data transfer (demand-based/event-based/periodic, etc.), events associated, periodicity of transfer, etc. Under a flexible API 35, even the details of the API processing (building such as the source of the attributes, the types, the sizes, the order, number of instances in case of arrays, etc.) are captured so that a brand new API can be loaded into the aircraft avionic system; upon which the aircraft avionic system can build the response automatically based on the content. The identifications (IDs) of the pilots (Pilot IDs 20) enable only a select set of pilots based on the pilot IDs 20 as authorized to access the connectivity feature and initiate various modes to change the CACDB file data. The client IDs 25 are the particular EFB client applications that are authorized or approved based on a client ID 25 associated with the particular EFB client application.

The list of the APIs and attributes contained in the flexible API 35 and parameter attribute 15 lists provide which upload and download services that an air carrier (i.e., an aircraft avionic system) can access and subscribe to. The private key contained in the list of public and private key 30 data of the CACDB file 10 is used to decipher any encrypted data that is sent by the EFB applications for limiting access to the encrypted data and for enhancing cybersecurity with the data transported back and forth internally and externally of the aircraft avionic systems. The CACDB file 10 contents from the retain memory is sent back and forth between the repository 40 configured in static non-volatile memory (NVM) to store the CACDB file 10 content.

Figure 2:
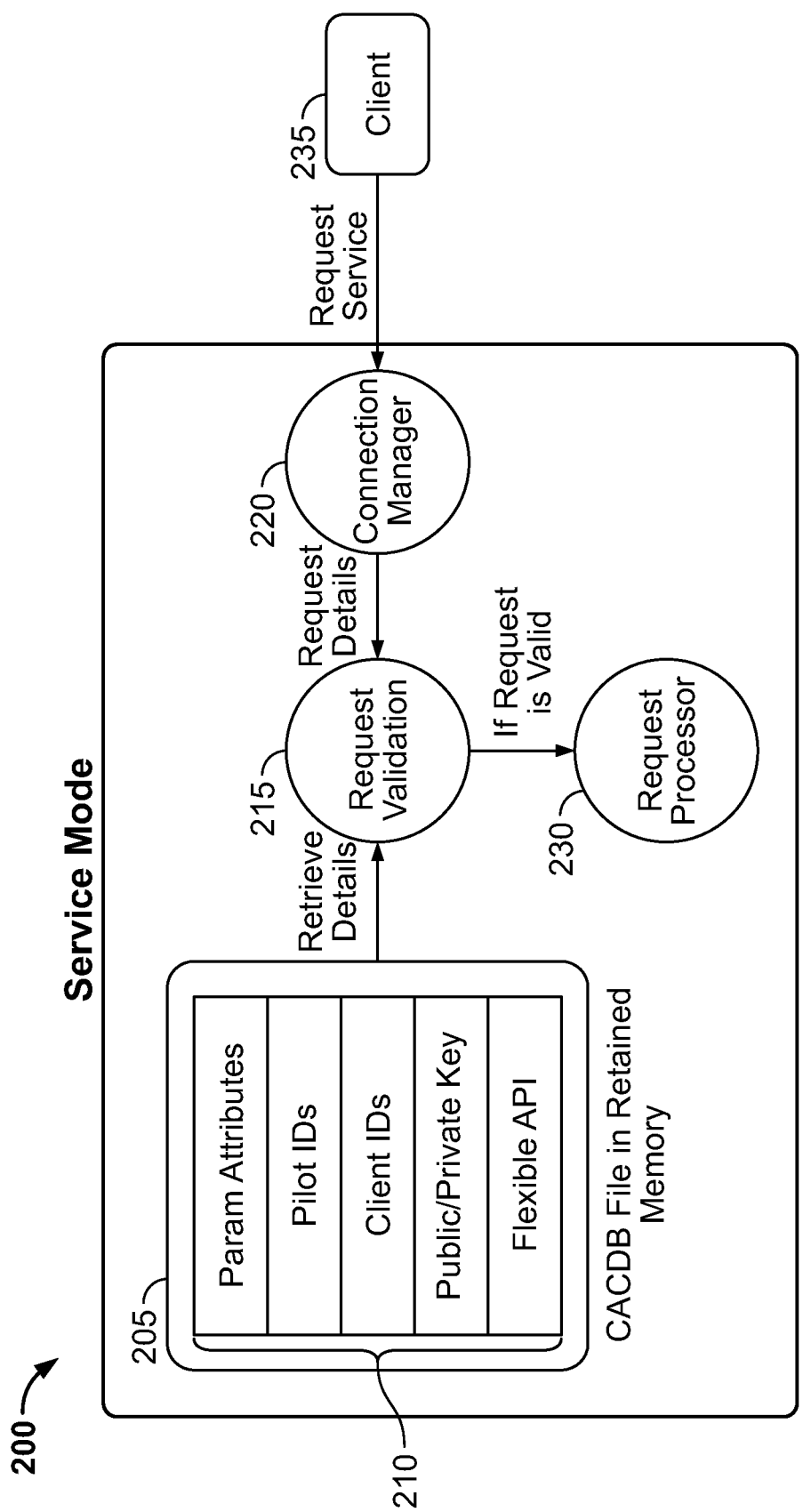
FIG. 2 illustrates an exemplary initiation of a service mode of the connected aircraft config file system in accordance with an embodiment.

FIG. 2 illustrates an exemplary initiation of a service mode of the connected aircraft config file system in accordance with an embodiment.

In FIG. 2, in normal mode 200 of the CACDB file system during an operation and service mode, the FMS is configured to consult the CACDB image data presented in the retained memory or RAM of the FMS or connected aviation system to perform a series of functions with various EFB applications. The functions can include the FMS ensuring by validation and authenticating steps that the flight crew member (i.e., the pilot) who requests the authorized session is authorized or allowed access to make the authorized session request when the session request is made. Further, if it is the case that a client application is attempting to establish a session, ensuring by the FMS by a series of validation steps that client application when trying to establish the session, is authorized to enter a session. Next, to ensure that the API service that the client application has requested has been subscribed to by the client application by an analysis of which services are encrypted and subsequently having to decrypt service content. For example, the FMS may initially in a first step have to determine which of a set of services are encrypted, and which are not encrypted. Next, if it is the case that a service is determined by the FMS to be encrypted, then the FMS will categorize the services as encrypted based on time, event or other parameters. The FMS will also have categorized which services are not to be encrypted. Further, for the required decryption and encryption tasks, the FMS will determine the steps needed to perform the decryption task of having to acquire a private key and to use the private key to decrypt encrypted requests. In an exemplary example, a decryption task may include a request for encrypted flight plan upload of data requiring decryption for receipt to an EFB application. The encryption task by the FMS may require the steps of having to acquire the public key and to use the public key to encrypt a response, for example, of a flight plan containing downloaded data that is required to be transmit from the EFB application. Also, in an exemplary embodiment, to process tasks, in a normal mode, the FMS can consult the CACDB image data retained in local memory to obtain a flexible API format in order to process generic requests from a processor or response builder that relies on API requests in operation.

Figure 3:
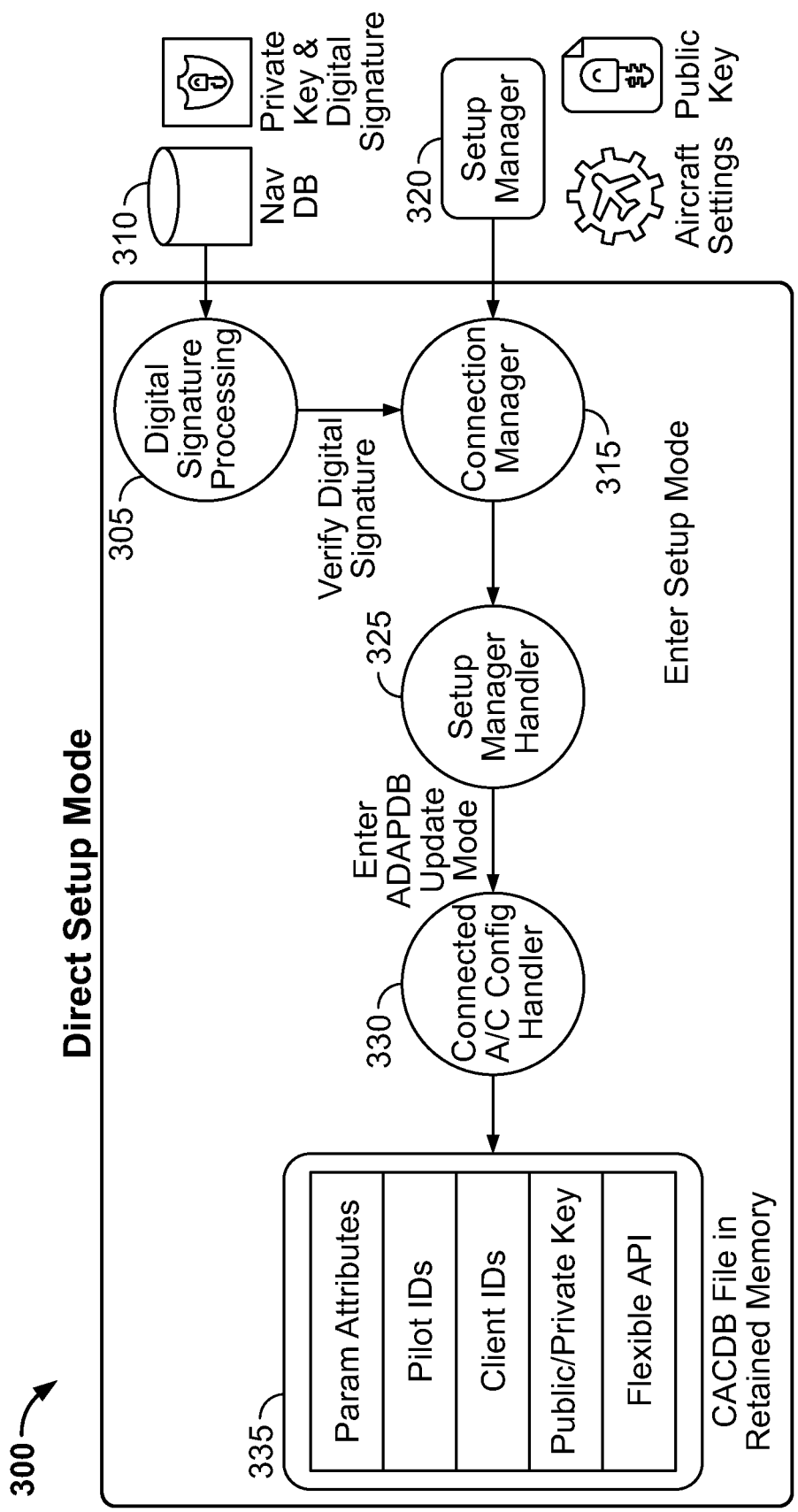
FIG. 3 illustrates an exemplary initiation of a setup mode of the connected aircraft config file system in accordance with an embodiment.

FIG. 3 illustrates an exemplary initiation of a direct setup mode of the connected aircraft config file system in accordance with an embodiment.

In FIG. 3, there is shown another mode of operation of the FMS. In this mode, the FMS (not shown) will present a direct setup mode 300 in which an open world application is allowed to alter the content of the CACDB file in the retained memory (e.g., RAM, FLASH, etc.). In order to make the changes to the content of the CACDB file, the setup manager initially is required to perform an authentication step to ensure that the FMS has permission or the authority to make the changes. The FMS performs the authentication with a special digital signature 305 that is encrypted by a special public key. The FMS upon receiving the data for the digital signature, will, from a navigation database 310 that stores special private keys based on the digital signature data, first decrypt the signature using the private key it already has and then compares if this matches with the expected setup manager digital signature it already has.

To perform this signature validation, the FMS is configured to either require or likely need to retain a pre-existing copy of a private license key for decryption and digital signature. The private license key is accessed by the FMS from either the NVM file, the retained memory, or a loadable file (e.g., from a navigation database).

If the digital signature which the setup manager 320 sends to the connection manager 315 is determined by the connection manager 315 to be successfully decrypted and to match, then the FMS will send a setup manager handler 325 when entering the direct setup mode to access via a connected A/C config handler 330 the CACDB file 335. The connected A/C config handler 330 will enable the setup manager 320 to access the CACDB file 335 and update the CACDB file 335 contained in the retained memory or RAM. However, if the digital signature is mismatched or fails to match, resulting in an unsuccessful decrypt attempt, then the setup manager 320 will not receive both the setup manager handler 325 and the connected aircraft (A/C) config handler 330 to access the CACDB file 335 and will be denied service by the connection manager 315.

In the absence of retained memory, the contents of the CACDB file in RAM can also be optionally stored into static memory (even in NVM sections like BITE) and read back later to restore the contents into the RAM or other non-static memory.

Figure 4:
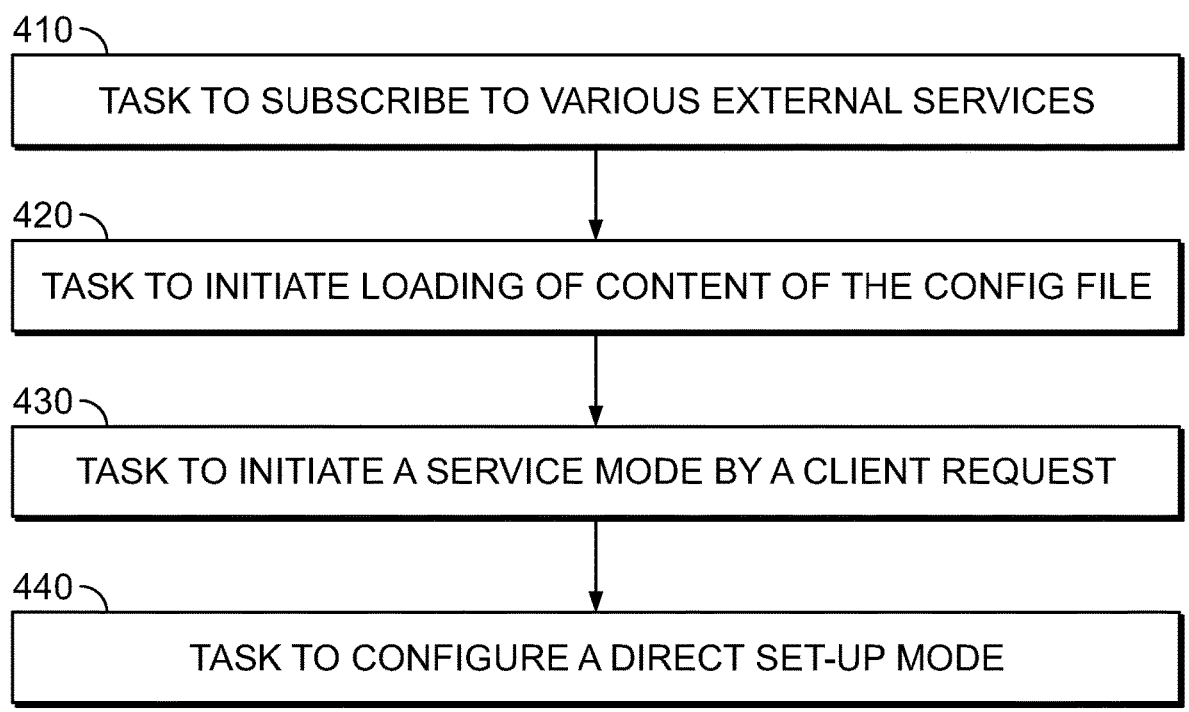
FIG. 4 illustrates an exemplary flowchart to implement various modes of operation of the connected aircraft config file system in accordance with an embodiment.

FIG. 4 In the exemplary flowchart 400, in task 410, the receiving clients can either receive the content of the CACDB file based on subscribed services or can modify the amount of data received in the contents of the CACDB file based on subscribed services, data rates, and data services provided. Since the CACDB file is a loadable field file that consists of a structured database, the subscriber or client can request certain config file data for information desired based on authorization, usage, real-time data available, and processing needs of EFB services of the aircraft's avionics systems for the flight planning. The onboard systems of an aircraft will be configured for access dependent on authorization and validation steps.

At task 420, the FMS is placed in an init-mode to initiate loading by a config file system to download the CACDB file from an external server. In the init mode task 420, the EFB hosted application is configured with data from a new config file and can either be configured as a separately loadable config file or could be bundled along with the FMS application software. The retrieval operation can be performed by automated or semi-automated uploaded actions or downloaded by the EFB application and stored in the retain memory of the FMS or other aircraft avionic systems. During the init-mode, the CACDB file is configured with various data details for use when connecting by the aircraft avionic systems based on parameter attributes and various data details provided. The data details may include the APIs available and the type of data transfers to be performed. Also, init mode task 420, a flexible API is configured that makes available further processing details such as during the building process of the config data file, the source of the attributes, types, sizes, and order that will be loaded into the aircraft avionic system. With the flexible API, the aircraft avionic system can build the response automatically based on the content. Other available details that are captured in the loading of the config file include the pilot IDs for determining which pilots have or allowed access to the config file, the client IDs of authorized clients (i.e., clients that been given access), and the private key data for decrypting encrypted client requests for a particular EFB client application. During the init-mode, the config file content can be sent back and forth between retained memory and NVM for storing if the retained memory is configured only with RAM.

At task 430, the service mode is initiated by a client request. In a normal mode for service operation, the FMS is configured to consult the CACDB image data contained in the config file presented in the retained memory of RAM of the FMS for functions to complete responses to requests of particular EFB applications. The functions can include the FMS ensuring by validation steps that a pilot or other user has permission for a session request, or whether the pilot or other user is authorized to make the session request. Also, the functions can be applied to clients of EFB applications making data requests for config file content. The authorization and validation steps can be performed in single or multiple steps via the use of the content of the flexible API. Also, with the use of the flexible API, services that are requested can be determined to be encrypted or not, and further whether retry of private key data required is authorized. Finally, if the private key data is authorized, then during a decrypt process, the private key used is validated. For example, a private key can be acquired and determined for to decrypt encrypted requests that are protected such flight plan uploaded data. Also, in the normal mode, the FMS can consult the CACDB image data retained in local memory to obtain a flexible API format in order to process generic requests from a processor or response builder that relies on API requests in operation.

At task 440, a direct setup mode is initiated by the FMS in which an open world application is allowed to alter the content of the config file in the retained memory. In order to make the changes to the content of the file, the setup manager initially is required to perform an authentication step to ensure that the FMS has permission or the authority to make the changes. The FMS performs the authentication with a special digital signature that is encrypted by a special public key. The FMS, on receiving the data for the digital signature, will, from a navigation database storing special private keys, use the digital signature data to first decrypt the signature using the private key, then compare if this matches with the expected setup manager digital signature in the FMS's possession. If the digital signature from the setup manager is determined by the connection manager to be successfully matched, then the setup manager handler can access via a connected aircraft config handler the config file with the CACDB data. However, if the digital signature is mismatched or fails to match, the decrypt attempt will be unsuccessful and access to the config file and will be denied service by the connection manager.

Figure 5:
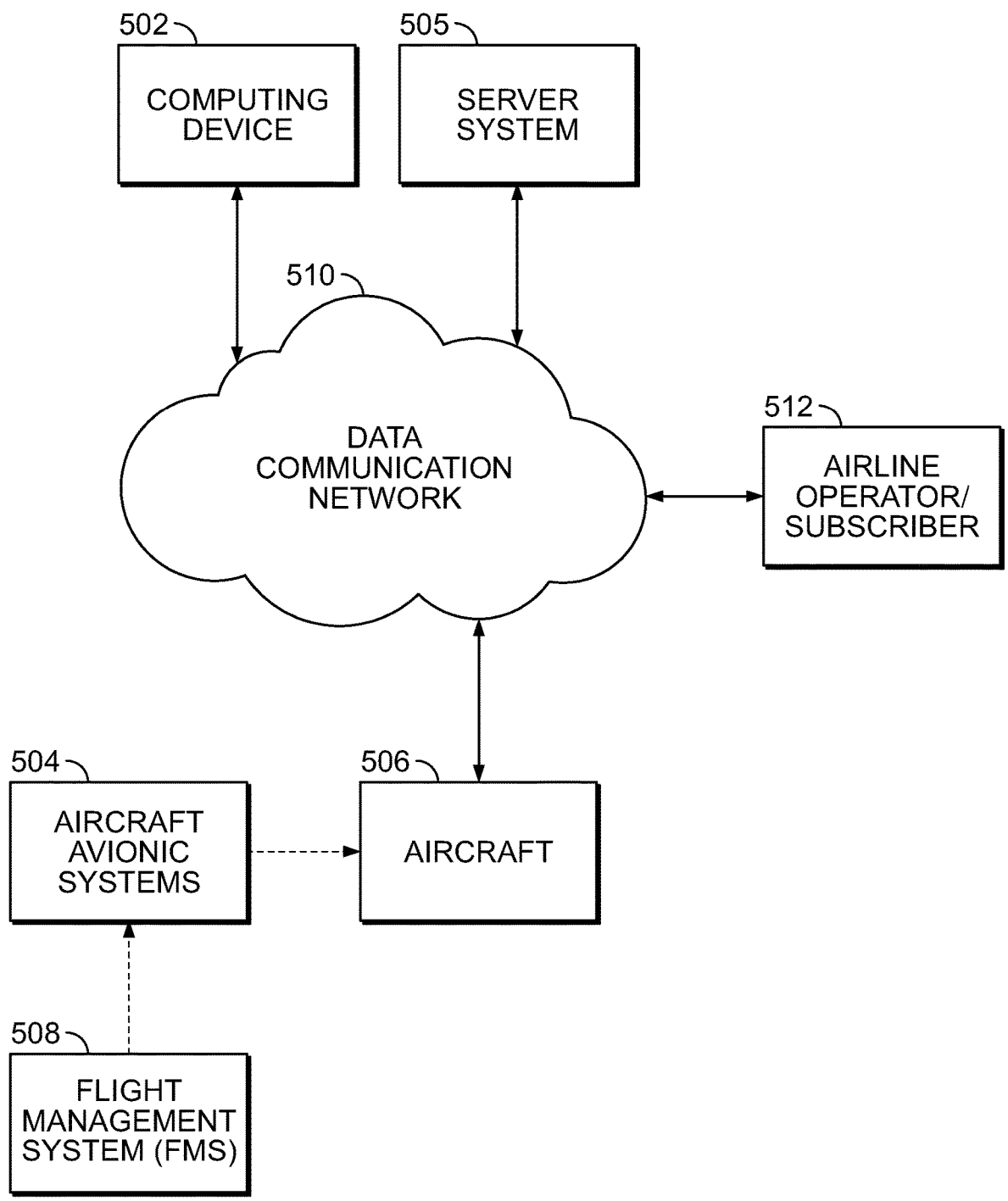
FIG. 5 is a network diagram of the connected aircraft config file system networked with the communication network aircraft in accordance with an embodiment.

FIG. 5 is a network diagram of the config file system in accordance with an embodiment. In FIG. 5, the network diagram 500 includes the server system 505 that stores real-time parameter data for access by the aircraft avionic system 504, including by the FMS 508. The FMS 508 is one such avionic system 504 identified on the aircraft 506 but it is contemplated that a variety of avionic systems 504 can be connected for access to data and other actions of a config file system located internally or externally to the aircraft 506. The aircraft 506 is in communication, via a data communication network 510, with the server system 505, the airline carrier operators 512, and a computing device 502, which provides client access.

The computing device 502 may be implemented by any computing device that includes at least one processor, some form of memory hardware, a user interface, and communication hardware. For example, the computing device 502 may be implemented using a personal computing device, such as a tablet computer, a laptop computer, a personal digital assistant (PDA), a smartphone, or the like. In this scenario, the computing device 502 is capable of storing, maintaining, and executing world connect applications associated with activities of clients and organizations for loading software files to the aircraft 506 avionic systems 504, including the FMS 508.

The aircraft 506 may be implemented as an airplane, helicopter, spacecraft, hovercraft, unmanned air vehicle, or the like. The one or more aircraft 506 avionic systems 504 may include any system capable of sending and receiving software config files via the communication systems of the aircraft 506.

The airline operator 512 or other subscribes by using a flexible API format can designate which data of a config file system that various applications such as EFB application onboard avionic systems 504 of their carrier aircraft 506 can have access to and what kind of data in a database of a config file system is accessible and usable in accordance with their subscribed services.

The server system 505 may include any number of application servers, and each server may be implemented using any suitable computer. In some embodiments, the server system 505 includes one or more dedicated computers. In some embodiments, the server system 505 includes one or more computers carrying out other functionality in addition to server operations. The server system 505 may store and provide any type of executable applications and data (i.e. config file containing real-time data or the like) that is compatible with the computing device 502, the avionic system 540, and is related to the updating, appending, loading of software config files as required by the flight personnel of an aircraft between the computing device 502, the server system 505, and the computing device 502.

The computing device 502 is usually located with the aircraft crew, or technical personnel or onboard the aircraft 506, and the computing device 502 communicates with the one or more avionic systems 504 on the aircraft 506 via wired and/or wireless communication connection. The computing device 502, the avionic system 504, and the server system 505 are generally disparately located, and the avionic system 504 and computing device 502 communicate with the server system 505 via the data communication network 510 and/or via communication mechanisms onboard the aircraft 506.

The data communication network 510 may be any digital or other communications network capable of transmitting messages or data between devices, systems, or components. In certain embodiments, the data communication network 510 includes a packet-switched network that facilitates packet-based data communication, addressing and data routing. The packet-switched network could be, for example, a wide area network, the Internet, or the like. In various embodiments, the data communication network 510 includes any number of public or private data connections, links, or network connections supporting any number of communications protocols. The data communication network 510 may include the Internet, for example, or any other network-based upon TCP/IP or other conventional protocols. In various embodiments, the data communication network 510 could also incorporate a wireless and/or wired telephone network, such as a cellular communications network for communicating with mobile phones, personal digital assistants, and/or the like. The data communication network 510 may also incorporate any sort of wireless or wired local and/or personal area networks, such as one or more IEEE 802.3, IEEE 802.16, and/or IEEE 802.11 networks, and/or networks that implement a short-range (e.g., Bluetooth) protocol. For the sake of brevity, conventional techniques related to data transmission, signaling, network control, and other functional aspects of the systems (and the individual operating components of the systems) may not be described in detail herein.

Figure 6:
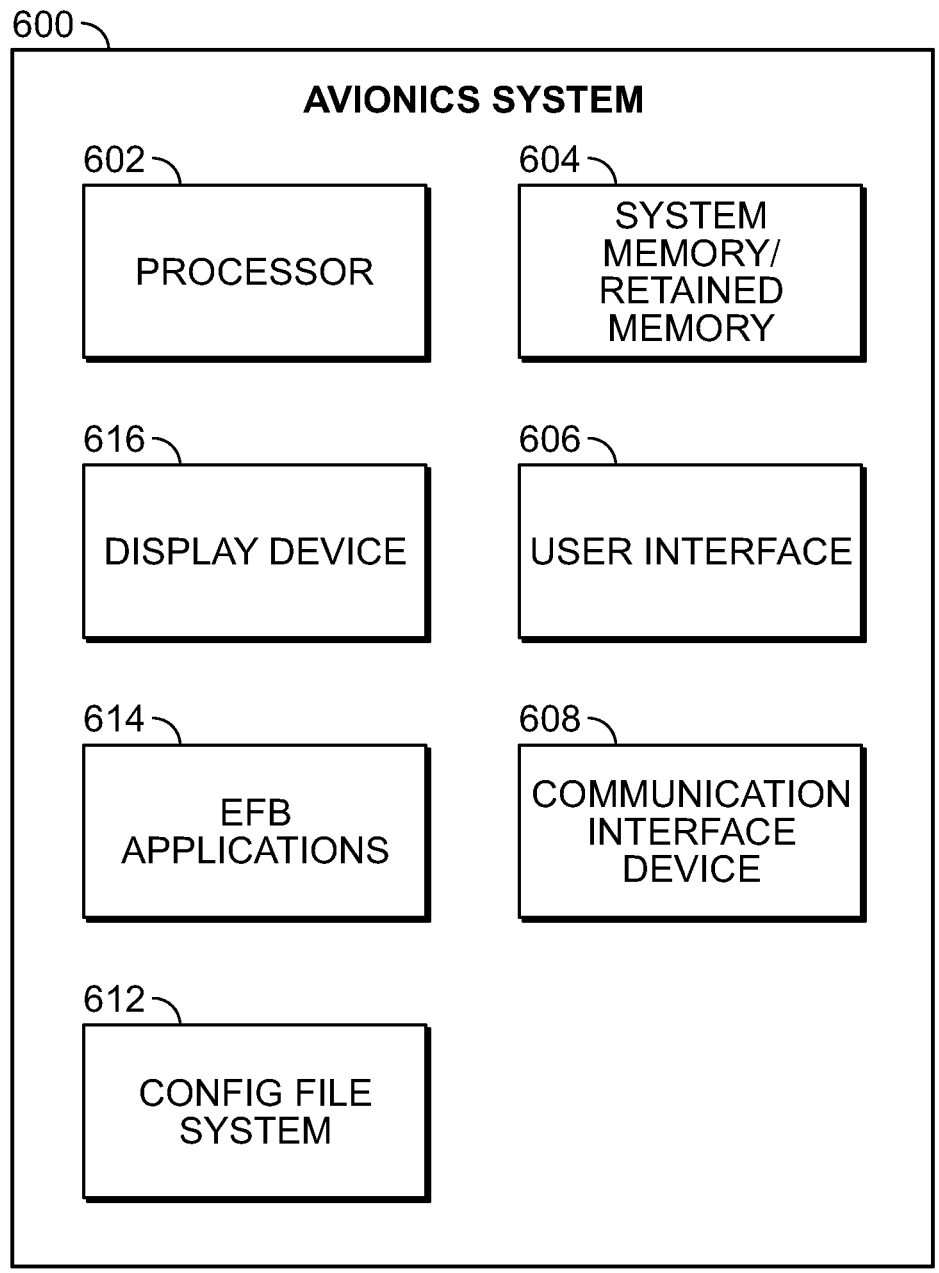
FIG. 6 is a functional block diagram of an avionic system that implements the connected aircraft config file system networked with the communication network aircraft of the connected aircraft config file system in accordance with an embodiment.

FIG. 6 is a functional block diagram of an FMS or other avionic system related to the config file system in accordance with an embodiment. It should be noted that the avionic system 600 can be implemented with a computing device and/or incorporated in the FMS depicted in FIG. 5. In this regard, the avionic system 600 shows certain elements and components of a computing type device in more detail.

The avionic system 600 includes, without limitation: at least one processor 602; system memory 604; a user interface 606; a communication interface device 608; software config files of the config file system 612; EFB applications 614; and a display device 616. These elements and features of the avionic system 600 may be operatively associated with one another, coupled to one another, or otherwise configured to cooperate with one another as needed to support the desired functionality—in particular, the config file system 612 that is used.

For ease of illustration and clarity, the various physical, electrical, and logical couplings and interconnections for these elements and features are not depicted in FIG. 6. Moreover, it should be appreciated that embodiments of the avionic system 600 will include other elements, modules, and features that cooperate to support the desired functionality. For simplicity, FIG. 6 only depicts certain elements that relate to the techniques described in more detail below.

The at least one processor 602 may be implemented or performed with one or more general-purpose processors, a content addressable memory, a digital signal processor, an application-specific integrated circuit, a field-programmable gate array, any suitable programmable logic device, discrete gate or transistor logic, discrete hardware components, or any combination designed to perform the functions described here. In particular, the at least one processor 602 may be realized as one or more microprocessors, controllers, microcontrollers, or state machines. Moreover, the at least one processor 602 may be implemented as a combination of computing devices, e.g., a combination of digital signal processors and microprocessors, a plurality of microprocessors, one or more microprocessors in conjunction with a digital signal processor core, or any other such configuration.

The at least one processor 602 is communicatively coupled to the system memory 604. The system memory 604 or retained memory is configured to store any obtained or generated data associated with config file system. The system memory 604 may be realized using any number of devices, components, or modules, as appropriate to the embodiment. Moreover, the avionic system 600 could include system memory 604 integrated therein and/or system memory 604 operatively coupled thereto, as appropriate to the particular embodiment. In practice, the system memory 604 could be realized as RAM memory, flash memory, EPROM memory, EEPROM memory, registers, a hard disk, a removable disk, or any other form of storage medium known in the art.

The user interface 606 may include or cooperate with various features to allow a user to interact with the avionic system 600. Accordingly, the user interface 606 may include various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the avionic system 600.

In certain embodiments, the user interface 606 may include or cooperate with various features to allow a user to interact with the avionic system 600 via graphical elements rendered on a display element (e.g., the display device 616). Accordingly, the user interface 606 may initiate the creation, maintenance, and presentation of a graphical user interface (GUI). In certain embodiments, the display device 616 implements touch-sensitive technology for purposes of interacting with the GUI. Thus, a user can manipulate the GUI by moving a cursor symbol rendered on the display device 616, or by physically interacting with the display device 616 itself for recognition and interpretation, via the user interface 606.

The communication interface device 608 is suitably configured to communicate data between the avionic system 600 and one or more remote servers and one or more avionics systems onboard an aircraft. The communication interface device 608 may transmit and receive communications over a wireless local area network (WLAN), the Internet, a satellite uplink/downlink, a cellular network, a broadband network, a wide area network, or the like. As described in more detail below, data received by the communication interface device 608 may include, without limitation: data of the orchestrated activities by maintenance technician from issued service bulletins in clients per the rules formed by trusted workflow contracts of entities associated with nodes in servers in the blockchain network.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium," "processor-readable medium," or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic is shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit include custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices.

Similarly, operational data may be embodied in any suitable form and organized within any suitable type of data structure. The operational data may be collected as a single data set, or may be distributed over different locations, including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flight management method implemented by an avionic system, the method comprising:
   uploading to a random access memory (RAM) of the avionic system during an initialization load mode, an aircraft configuration (config) file associated with an electronic flight bag EFB application configured to interface with a flight management system (FMS), wherein the config file is lost during a power shut down of the avionic system and is loaded into the RAM memory each time the avionic system enters the initialization load mode during a powering up of the avionic system;
   when operating in a normal mode, the FMS is configured to access the config file, to implement at least one validation procedure from a set of validation procedures responsive to a request for a session received from the EFB application, wherein the set of validation procedures comprise:
      upon a determination that the request is a user request, validating that the user request for the session is authorized based on user identification data retrieved from the config file,
      upon a determination that the request is a client request, validating that the client request for the session is authorized based on client identification data retrieved from the config file, and
      upon a determination that the request is encrypted decrypting the request using a private key retrieved from the config file; and
   encrypting a response to the request using a public key retrieved from the config file.

2. The method of claim 1, further comprising:
   configuring, in the avionic service, the config file as a connected Aircraft Configuration Database (CACDB) file.

3. The method of claim 1, further comprising:
   in a direct setup mode by the FMS to connect to the config file, configuring a setup manager to execute an open-world application in order to make alterations to content of the config file by another validation procedure of a setup manager using a digital signature encrypted by the public key wherein the validation procedure of the setup manager comprises an authentication procedure.

4. The method of claim 3, further comprising:
   during the authentication procedure of the setup manager, receiving by the FMS, digital signature information to decrypt the digital signature in conjunction with using the private key based on private key data in the config file to enable the decrypt of content of the config file.

5. The method of claim 4, further comprising:
   after decryption of the digital signature information in the authentication procedure of the setup manager, comparing, by the FMS, a digital signature key based on the digital signature to a private key already in a setup manager's possession wherein if a private key matches the digital signature key, then validating the setup manager's private key.

6. The method of claim 5, further comprising:
   in response to a setup manager's validation of the private key in the authentication procedure, enabling initiation of a direct setup mode by the setup manager to update content of the config file.

7. The method of claim 1, wherein content of config file comprises a list of parameter attributes, pilot identifications, client identifications, public and private keys, and flexible APIs.

8. An avionic system configured for flight management service, comprising:
   an aircraft configuration (config) file associated with an electronic flight bag (EFB) application configured to interface with a flight management system (FMS), wherein:
      the config file is configured to be uploaded to a random access memory (RAM) of a avionic system during an initialization load mode,
      the config file is lost during a power shut down of the avionic system, and
      the config file is loaded into the RAM memory each time the avionic system enters the initialization load mode during a power up of the avionic system;
   the FMS is configured to operate in a normal mode and access the config file to implement at least one validation procedure of a set of validation procedures responsive to a request for a session received from the EFB application wherein the set of validation procedures comprise:
      upon a determination that the request is a user request, validating that the user request for the session is authorized based on user identification data retrieved from the config file,
      upon a determination that the request is a client request, validating that the client request for the session is authorized based on client identification data retrieved from the config file, and
      upon a determination that the request is encrypted decrypting the request using a private key retrieved from the config file; and
   the FMS is configured to encrypt a response to the request using a public key retrieved from the config file.

9. The avionic system of claim 8, further comprising:
   in the avionic service, the config file is configured as a Connected Aircraft Configuration Database (CACDB) file.

10. The avionic system of claim 8, further comprising:
    in a direct setup mode by the FMS for connection to the config file, a setup manager configured to execute an open-world application in order to make alterations to content of the config file via a third validation procedure by a setup manager configured to use a digital signature which has already been encrypted by the public key wherein the validation procedure of the setup manager comprises an authentication procedure.

11. The avionic system of claim 10, further comprising:
in execution of the authentication procedure by the setup manager, the FMS configured to receive digital signature information for decryption of the digital signature in conjunction with use of the private key based on private key data in the config file to enable the decryption procedure.

12. The avionic system of claim 11, further comprising:
after decryption of the digital signature information, the FMS configured to compare a digital signature key based on the digital signature to a private key already in possession by the setup manager wherein,
if a private key matches the digital signature key, then enabling validation of the setup manager's private key.

13. The avionic system of claim 12, further comprising:
in response to a setup manager's validation of the private key, the FMS configured to initiate a direct setup mode by the setup manager to update content of the config file.

14. The avionic system of claim 8, wherein the config file's content comprises a list of parameter attributes, pilot identifications, client identifications, public and private keys, and flexible APIs.

15. An apparatus for flight management service, the apparatus comprising:
at least one processor deployed in an avionic system and coupled to a random access memory (RAM), wherein an aircraft configuration (config) file associated with an electronic flight bag (EFB) application that is configured to interface with a flight management system (FMS) is uploaded to the RAM during an initialization load mode, wherein the config file is lost during a power shut down of the avionic system and is loaded into the RAM memory each time the avionic system enters the initialization load mode during a powering up of the avionic system, the at least one processor programmed to when operating in a normal mode to enable the FMS to access the config file to implement at least one validation procedure from a set of validation procedures responsive to a request for a session received from the EFB application, wherein the set of validation procedures comprise:
upon a determination that the request is a user request, validate that the user request for the session is authorized based on user identification data retrieved from the config file;
upon a determination that the request is a client request, validate that the client request for the session is authorized based on client identification data retrieved from the config file;
upon a determination that the request is encrypted decrypt the request a using a private key retrieved from the config file; and
encrypt a response to the request using a public key retrieved from the config file.

16. The apparatus of claim 15, further comprising:
the processor programmed to:
configure the config file as a connected Aircraft Configuration Database (CACDB) file.

17. The apparatus of claim 15, further comprising:
the processor programmed to:
in a direct setup mode for connection to the config file, configure a setup manager to execute an open-world application in order to make alterations to content of the config file by a third validation procedure by a setup manager configured to use a digital signature which has already been encrypted by the public key wherein the validation procedure of the setup manager comprises an authentication procedure.

18. The apparatus of claim 17, further comprising:
the processor programmed to:
in performance of the authentication procedure by the setup manager, receive digital signature information to decrypt the digital signature in conjunction with use of the private key based on private key data in the config file to enable the decryption procedure.

19. The apparatus of claim 18, further comprising:
the processor programmed to:
after decryption of the digital signature information, compare a digital signature key based on the digital signature to a private key already in possession by the setup manager wherein if a private key matches the digital signature key, then enabling validation by of the setup manager's private key.

20. The apparatus of claim 19, further comprising:
the processor programmed to:
in response to a setup manager's validation of the private key, enable initiation of a direct setup mode by the setup manager to update content of the config file.

* * * * *

UNITED STATES PATENT AND TRADEMARK OFFICE
CERTIFICATE OF CORRECTION

PATENT NO. : 11,695,556 B2
APPLICATION NO. : 17/082539
DATED : July 4, 2023
INVENTOR(S) : Ravikumar Selvarajan and Philip Toews It is certified that error appears in the above-identified patent and that said Letters Patent is hereby corrected as shown below:

In the Claims

Column 16, Line 36-37 (Claim 8), after "and", insert -- to --
Column 18, Line 6 (Claim 15), after "request", delete "a"

Signed and Sealed this
Sixteenth Day of April, 2024

Katherine Kelly Vidal
Director of the United States Patent and Trademark Office